United States Patent [19]

Reisinger et al.

[11] Patent Number: 5,066,024
[45] Date of Patent: Nov. 19, 1991

[54] BRUSH-TYPE SEAL

[75] Inventors: Lothar Reisinger, Dachau; Dieter Hagg, Karlsfeld; Werner Wenzl; Klaus Walther, both of Munich, all of Fed. Rep. of Germany

[73] Assignee: MTU Motoren- Und Turbinen-Union Munchen GmbH, Fed. Rep. of Germany

[21] Appl. No.: 581,150

[22] Filed: Sep. 10, 1990

Related U.S. Application Data

[63] Continuation of Ser. No. 302,990, Jan. 30, 1989, abandoned.

[30] Foreign Application Priority Data

Jan. 29, 1988 [DE] Fed. Rep. of Germany ....... 3802653

[51] Int. Cl.$^5$ ............................................. F16J 15/447
[52] U.S. Cl. ...................... 277/53; 277/182; 277/184
[58] Field of Search ................. 277/53, 195, 194, 199, 277/182, 184

[56] References Cited

U.S. PATENT DOCUMENTS

| | | | |
|---|---|---|---|
| 1,762,819 | 6/1930 | Hughes | 277/183 X |
| 2,639,954 | 5/1953 | Potter | 277/183 X |
| 3,061,338 | 10/1962 | Clark | 285/202 |
| 4,678,113 | 7/1987 | Bridges et al. | 277/53 X |
| 4,781,388 | 11/1988 | Wohrl et al. | 277/53 |

FOREIGN PATENT DOCUMENTS

| | | |
|---|---|---|
| 33252 | 2/1908 | Austria . |
| 496497 | 1/1927 | Fed. Rep. of Germany ........ 277/53 |
| 2146717 | 4/1973 | Fed. Rep. of Germany ........ 277/53 |
| 3514382 | 6/1986 | Fed. Rep. of Germany . |
| 3606284 | 5/1987 | Fed. Rep. of Germany . |
| 839731 | 6/1960 | United Kingdom .................. 277/53 |
| 1417969 | 12/1975 | United Kingdom . |
| 1545930 | 5/1979 | United Kingdom . |
| 1598926 | 9/1981 | United Kingdom .................. 277/53 |

Primary Examiner—Allan N. Shoap
Attorney, Agent, or Firm—Evenson, Wands, Edwards, Lenahan & McKeown

[57] ABSTRACT

A brush-type seal has a wire bundle which is bent in a U-shape and is surrounded by a radially inward slotted ring shaped tube and by a housing consisting of two connected support rings. Application and maintenance of clamping forces is possible and is provided for to the ring shaped tube through the support rings. Attachments are provided on one supporting for fastening at a housing. The support rings are connected by welding at a welding joint which is spaced from the slotted tube which directly contacts the wire bundle.

10 Claims, 2 Drawing Sheets

BRUSH-TYPE SEAL

This is a continuation of application Ser. No. 07/302,990, filed Jan. 30, 1989, now abandoned.

BACKGROUND AND SUMMARY OF THE INVENTION

The invention relates to a brush-type seal having a wire bundle, which is bent around a core ring in a U-shape and is held by a ring-shaped slotted tube at its bent section.

This type of a brush-type seal is known from German Patent (DE-PS) 36 06 284. It is formed by bendingly winding a brush wire around two pins arranged in parallel and fitting a U-shaped clamping tube over and around the bending points of the wire bundles. As a result, the wires are fixed. Subsequently, the wire bristles are cut in parallel with respect to the pins for producing two brush-type seals. Then, the brush-type seals may be bent into the required circular shape.

This known seal has a disadvantage in that the pressing power applied by the clamping tube may abate with time. This may cause slipping of individual bristles and the occurrence of irregularities and leaks. In addition, fastening devices for the seal may have negative effects on the brush-type seal because of non-uniform fastening forces.

As a result, it is an object of the invention to provide a brush-type seal which is easy to fasten and ensures a constant pressing power to be applied to the bristles in order to obtain a stable suspension and fixing of the bristles.

According to the invention, this object is achieved by providing an arrangement wherein the tube is enclosed on both sides under tension by two support rings joined together to form a housing that applies a required clamping force to the wire bundle via the joined support rings and the tube. The support rings are joined together by means of welding or soldering. This arrangement provides for a secure, simple to construct, brush type sealing arrangement.

The arrangement according to the invention has the advantage that the clamping of the brushes is taken over by the joined support rings, while the slotted ring-shaped tube, which surrounds the brushes directly, only provides for the protection of the bristles.

In a preferred embodiment of the invention, the joining of the partial support rings takes place by welding or soldering, whereby the prestressing or the pressing power onto the brushes is achieved by the thermally caused shrinkage. This pressing power remains constant and thus ensures the constant functioning of the brush-type seal. Resistance inert-gas welding is particularly suitable for this purpose.

In a further development of certain preferred embodiments of the invention, one of the support rings is equipped with a device for the fastening of the brush-type seals to other components. As a result, a simple and detachable connection is possible for connecting the brush-type seal at a housing part. Such a connection occurs without any clamping force repercussions on the seal and thus insures the operability of the seal.

A further development of certain preferred embodiments of the invention provides that several support rings are arranged axially behind one another such that each wire bundle is provided between two support rings. Thus, double seals or multiple seals can be achieved with low space and fastening requirements.

Other objects, advantages and novel features of the present invention will become apparent from the following detailed description of the invention when considered in conjunction with the accompanying drawings.

DETAILED DESCRIPTION OF THE DRAWINGS

Figure 1:
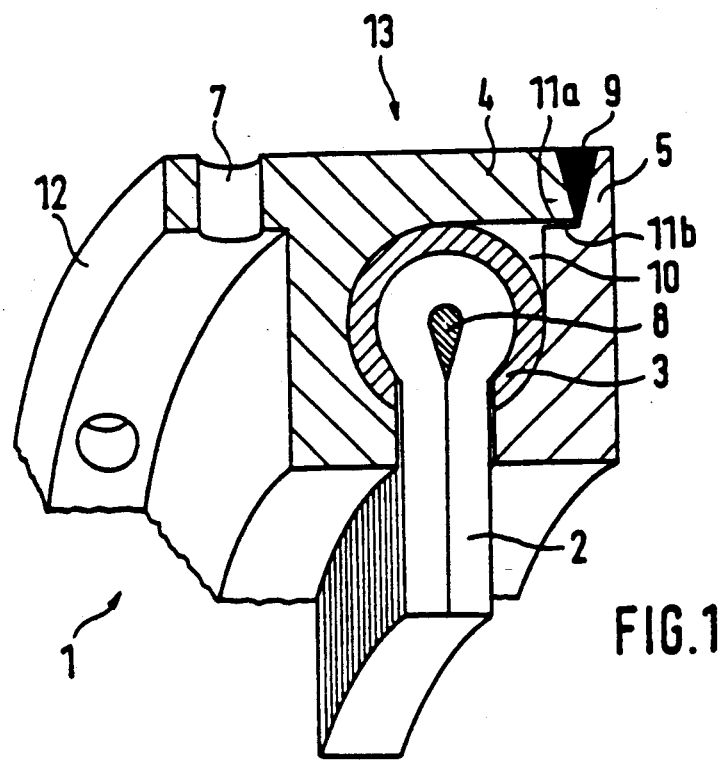
FIG. 1 is a schematic sectional view taken in a radial plane through an annular brush-type seal constructed according to a preferred embodiment of the invention.

Referring to FIG. 1, a brush-type seal 1 is shown. It consists of two coaxially arranged support rings 4 and 5, which, on their contact sides, have recesses so that an annulus 10 having a substantially circular cross-section is formed between them. In the annulus 10 is a wire bundle 2. The wire bundle is wound in a U-shape as it is bent around a core ring 8 having a preferably drop-shaped cross-section. The ends of the wire bundle 2 extend in parallel and radially toward the inside to thus form a sealing element which slides on a sealing surface 20, which is not shown in this Figure (see FIG. 3). The wire bundle 2, in its bent area, is surrounded by a curved tube 3 which is slotted in a ring-shaped manner. The slot opens radially inwardly and extends throughout the radial inner side of curved tube 3 to protect and guide the wire bundle 2. The two support rings 4 and 5 are shaped such that their joining point 9 is arranged to be offset with respect to the annulus 10. Surfaces 11a, 11b of the supporting rings 4, 5 are located radially, one on top of the other to cause a physical separation of the joining point 9 with respect to the annulus 10. This separation prevents an unacceptable heating of the tube 3 or of the wire bundle 2 during thermal joining (welding) of the support rings, which are clamped around the tube 3 before being joined, so as to provide a pressure clamping force to the tube 3.

The shown embodiment also has bore devices 7 arranged in a ring flange 12 for fastening at the housing or at other components. However, as an alternative, the brush-type seal 1 may also be fastened in any other known manner, for example, by means of clamping, soldering, welding or gluing.

Figure 2:
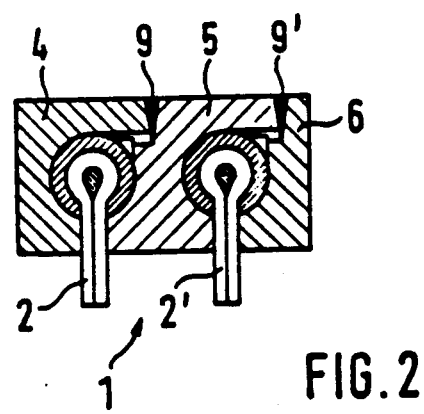
FIG. 2 is a sectional view of an alternative embodiment.

The embodiment shown in FIG. 2 concerns a double brush-type seal, in which two wire bundles 2 and 2' are arranged axially behind one another. The support rings 4, 5, 6 are connected with one another by two joining points 9, 9'. It is also possible to arrange three or more wire bundles 2, 2' axially behind one another.

Figure 3:
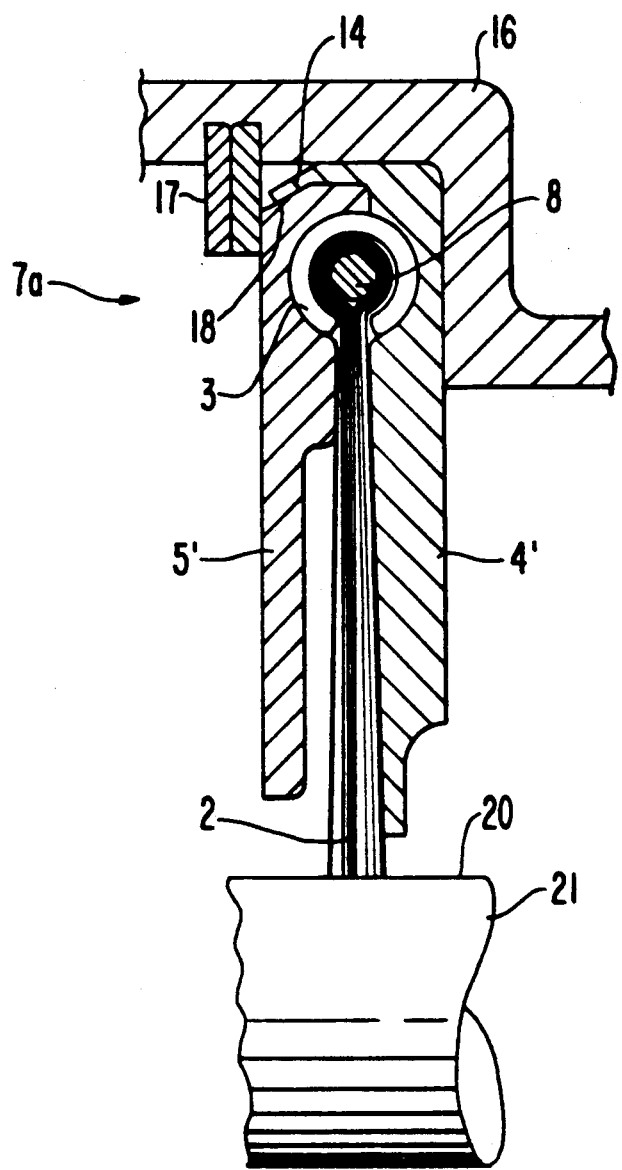
FIG. 3 is a sectional view of another embodiment.
Figure 4:
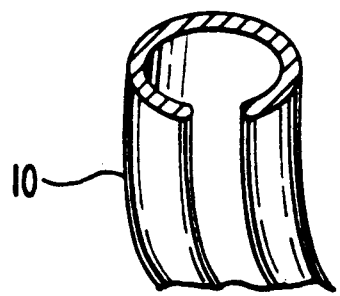
FIG. 4 is a sectional view of a portion of the annulus surrounding the wire bundles.

The embodiment of FIG. 3 shows support rings 4' and 5' which are held together by means of clamping lips 14, which are fixed on one support ring 4' and clamp the other support ring 5' at its radially outward circumference.

In this way a fixed connection between the support rings 4' and 5' is achieved together with the appropriate clamping force for the tube 3 surrounding the wire bundles 2.

The second support ring 5' has a circumferential conical surface 18 on its face opposite the other support ring 4' where the clamping lips 14 of the latter are located. The connection of both support rings is achieved by a rolling process between the conical surface 18 and the clamping lips 14. Thus a quick and simple connection is achieved which makes finishing procedures unnecessary. Further the material of both support rings can be chosen individually as is suited to specific circumstances, for example thermic expansions.

The brush-type seal 1a shown in FIG. 3 is fixed in a casing 16 by means of securing rings 17. The low pressure sided support ring 4' is extended radially inward and adjacent to a sealing surface 20 in order to support the wire bundle 2 against gas pressure forces due to the pressure gradient on both sides of the seal 1a. The seal is shown in contact with a sealing surface 20 of a rotating member 21.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A brush-type seal comprising:
a wire bundle, which has a mid-portion bent around a core ring in a U-shape;
a ring-shaped tube having a continuous slot on a radially inwardly facing surface to surround the bent around mid portion of the wire bundle;
wherein the tube is tensioned on opposite axial sides by two support rings joined together to form a housing, said two support rings being joined by a process that applies a required clamping force to the wire bundle via the joined support rings and the tube; and
wherein the process that joins the support rings together is welding or soldering.

2. A brush-type seal according to claim 1, wherein one of the support rings is equipped with fastening means for connecting the brush-type seal to other components.

3. A brush-type seal according to claim 1, wherein a joining point of the two support rings is physically separated with respect to the tube by surfaces of the support rings, which are located adjacent to one another.

4. A brush-type seal according to claim 1, wherein the support rings are joined together by means of resistance inert-gas welding.

5. A brush-type seal according to claim 1, wherein the seal contains a plurality of tubes of enclosed wire bundles; wherein the tubes are arranged axially behind one another along a common axis; and
wherein there are a plurality of support rings with only one support ring being provided between two of the plurality of tubes.

6. A brush-type seal comprising:
a wire bundle, which has a mid portion bent around a core ring in a U-shape;
a ring-shaped tube having a continuous slot on a radially inwardly facing surface substantially enclosing said mid portion and said core ring, wherein the tube, is enclosed on both sides under tension by two support rings joined together to form a housing that applies a required clamping force to the wire bundle via the joined support rings, and the tube, and wherein one of the support rings includes circumferentially spaced clamping lips, which clamp to said one support ring the other support ring at a radially outward circumference of said other support ring.

7. A brush-type seal according to claim 6, wherein the clamping lips are supported on a circumferential conical surface on a face of the other support ring.

8. A brush-type seal according to claim 6, wherein the clamping lips are positioned by way of a rolling process.

9. A brush-type seal according to claim 6, wherein the clamping lips are supported on a surface of a face of the one support ring and faces opposite the other support ring which has a clamping surface facing the clamping lips.

10. A brush-type seal comprising:
a wire bundle, which has a mid portion bent around a core ring in a U-shape;
a ring-shaped tube having a continuous slot on a radially inwardly facing surface to surround the bent around mid portion of the wire bundle;
wherein the tube is tensioned on opposite axial sides by two support rings joined together to form a housing, said support rings being joined by a process that applies a required clamping force to the wire bundle via the joined support rings and the tube;
wherein the process that joins the support rings together is welding or soldering; and
wherein a circumferential slot of V-formed cross section is defined axially between the support rings, said slot being filled with welding or soldering material.

* * * * *